United States Patent [19]
Lee et al.

[11] Patent Number: 6,155,345
[45] Date of Patent: Dec. 5, 2000

[54] DOWNHOLE GAS SEPARATOR HAVING MULTIPLE SEPARATION CHAMBERS

[75] Inventors: Woon Yung Lee, Bartlesville; Bobby D. Evans, Dewey, both of Okla.

[73] Assignee: Camco International, Inc., Houston, Tex.

[21] Appl. No.: 09/231,895

[22] Filed: Jan. 14, 1999

[51] Int. Cl.[7] .................................................. E21B 43/00
[52] U.S. Cl. .......................... 166/105.5; 166/265; 96/214; 96/217
[58] Field of Search .............................. 166/105.5, 105.6, 166/265; 96/157, 214, 217; 417/313, 423.3; 210/512.2

[56] References Cited

U.S. PATENT DOCUMENTS

| | | | |
|---|---|---|---|
| Re. 30,836 | 12/1981 | Bunnelle | 55/203 |
| 3,887,342 | 6/1975 | Bunnelle | 55/203 |
| 4,088,459 | 5/1978 | Tuzson | 55/203 |
| 4,481,020 | 11/1984 | Lee et al. | 55/203 |
| 4,531,584 | 7/1985 | Ward | 166/265 |
| 4,913,630 | 4/1990 | Cotherman et al. | 417/313 |
| 4,981,175 | 1/1991 | Powers | 166/265 |
| 5,209,765 | 5/1993 | Kolpak et al. | 96/157 |
| 5,482,117 | 1/1996 | Kolpak et al. | 166/265 |
| 5,525,146 | 6/1996 | Straub | 96/214 |

*Primary Examiner*—Victor Batson
*Attorney, Agent, or Firm*—Fletcher, Yoder & Van Someren

[57] ABSTRACT

A submergible pumping system having a gas separator with multiple separation chambers. The gas separator includes an outer housing having a hollow interior divided into a plurality of separation chambers. A shaft and an inducer are rotatably mounted within the hollow interior. A plurality of flow-through bearings are distributed through the hollow interior to support the rotatable shaft. Also, a plurality of vortex generators are disposed in the hollow interior to generate and maintain a fluid vortex during separation.

19 Claims, 4 Drawing Sheets

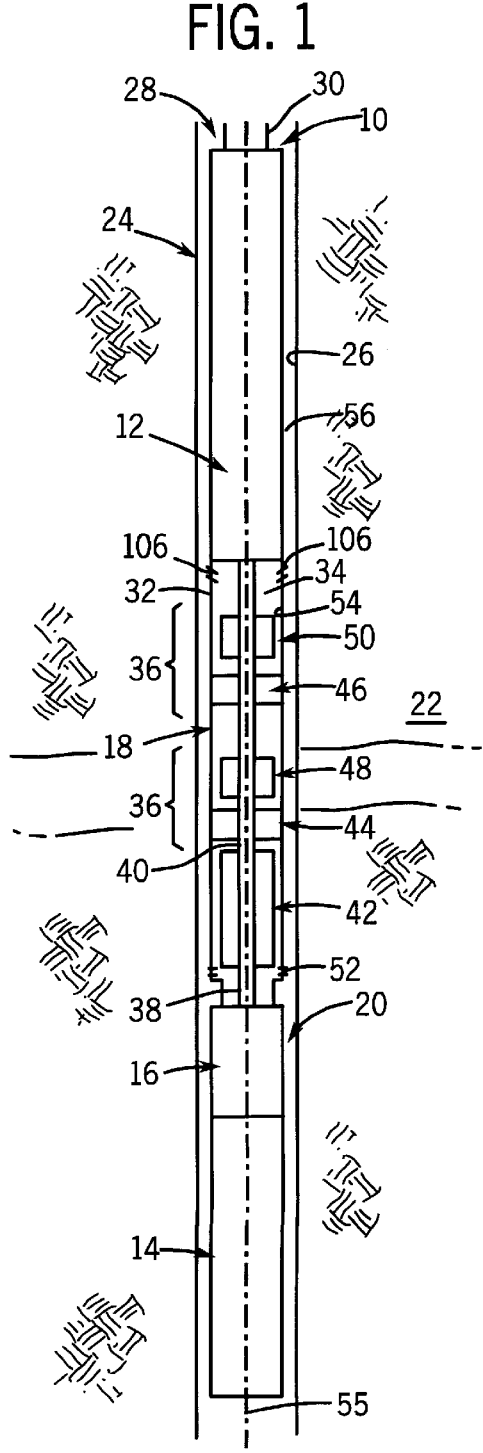
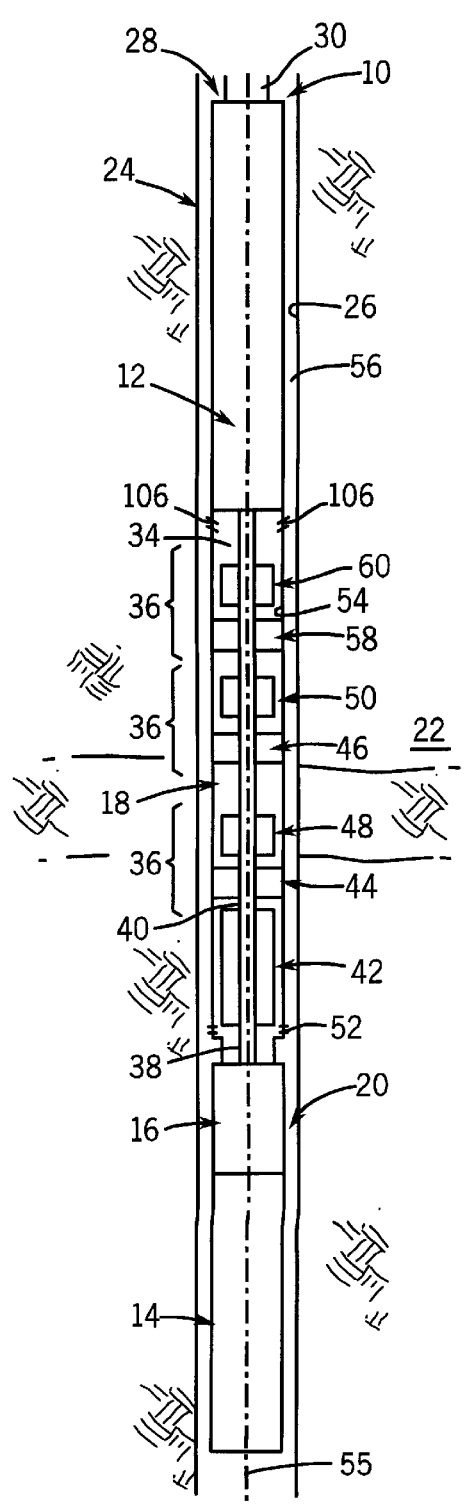

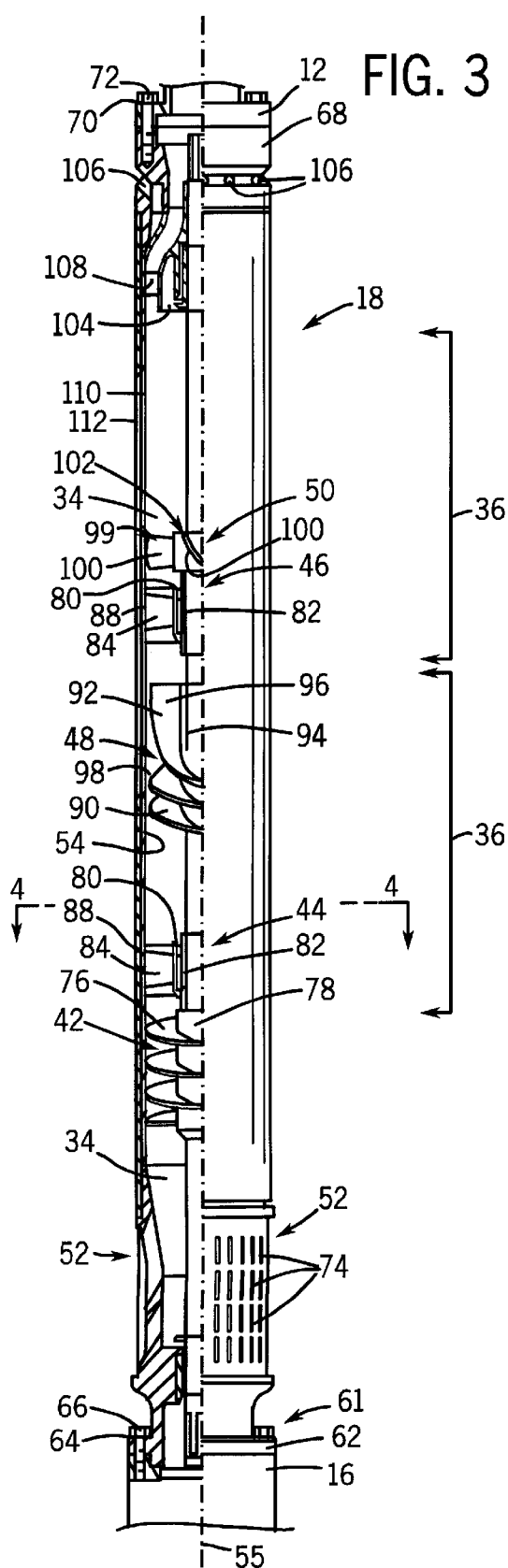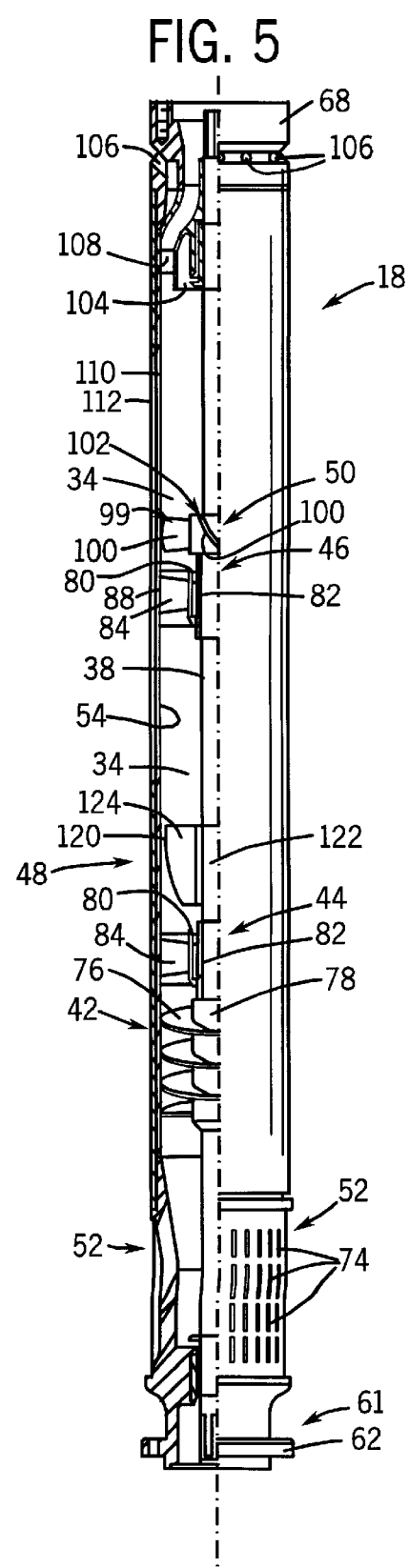

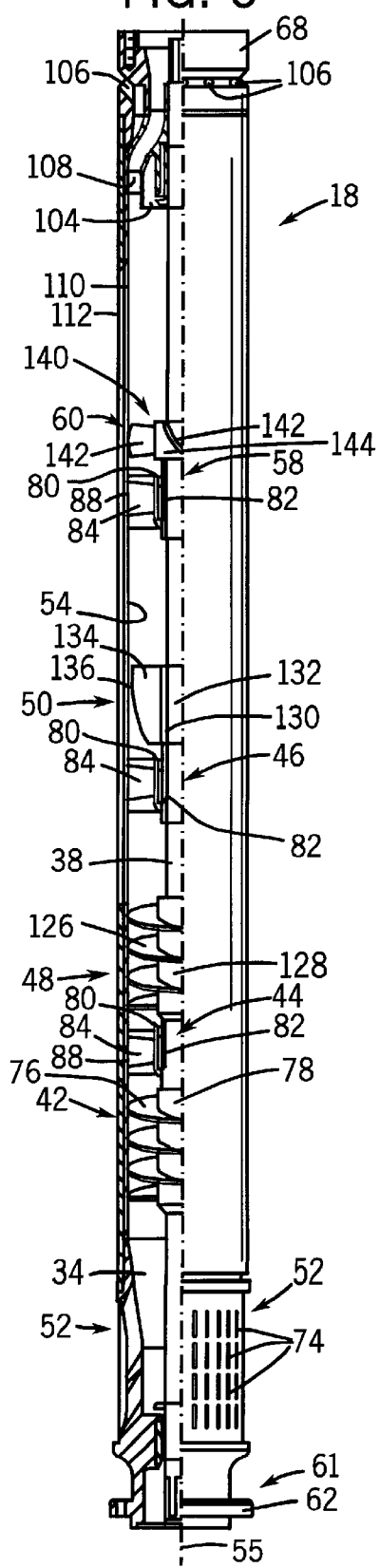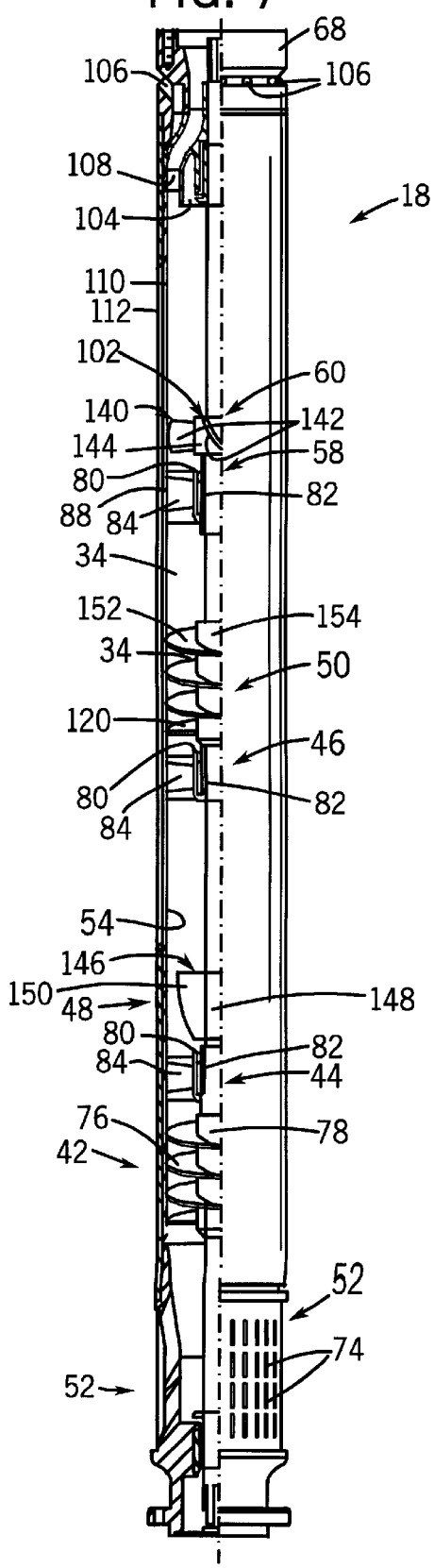

DOWNHOLE GAS SEPARATOR HAVING MULTIPLE SEPARATION CHAMBERS

FIELD OF THE INVENTION

The present invention relates generally to submergible pumping systems for raising fluids from wells, and particularly to a gas separator designed for use in a submergible pumping system.

BACKGROUND OF THE INVENTION

Submergible pumping systems are used for raising fluids, such as petroleum, through a wellbore drilled into the earth. The production fluids enter the wellbore via perforations formed in a well casing adjacent a production formation. Fluids, e.g. petroleum, contained in the formation collect in the wellbore and may be raised by the submergible pumping system to a collection point in another zone or above the surface of the earth.

Commonly, the produced fluid is a mixture of liquid and gas components. The gas component distributed through the fluid can reduce the efficiency of the submergible pump, and potentially can damage or reduce the life of the pump. Gas separators have been used to separate the gas component from the fluid prior to its entering the submergible pump of the submergible pumping system. Thus, the gas component can be routed around the pump and vented to the surface through, for example, the annulus formed between the wellbore casing and the tubing utilized to carry the produced fluid. Once the gas is separated, the liquid component may be pumped through, for instance, the production tubing or coiled tubing used to deploy the submergible pumping system.

A conventional gas separator uses an inducer to induce the produced fluid into a circular flow pattern as it moves through the hollow interior of the gas separator. Specifically, the inducer draws fluid from the wellbore into the gas separator where it is circulated along an interior wall of the gas separator as it moves upwardly into a separation chamber. A vortex generator, such as a propeller or a cylinder, is disposed in the separation chamber and is used to promote the circulation of fluid and the creation of a vortex. The centrifugal force created by the circulation causes the heavier liquid component to move to a radially outward position, while the lighter gas component remains in a more centralized radial position. Appropriate outlet channels are used to vent the gas component and to direct the liquid component to the submergible pump.

Generally, the gas separator is connected between a submergible electric motor and the submergible pump. A drive shaft connects the submergible electric motor with the submergible pump and provides power thereto. The drive shaft extends through the hollow interior of the gas separator, and often is used to rotate the inducer. Typically, the drive shaft is composed of individual sections in each system component. For example, the gas separator may include a self-contained section of the drive shaft designed to matingly engage a section of the drive shaft disposed in the submergible pump.

The gas separator also may include a propeller or rotating cylinder mounted to the shaft above the inducer. This propeller or rotating cylinder helps create a vortex within the gas separator to facilitate separation.

A problem with conventional gas separators, however, is that the separation chamber is not long enough to allow sufficient separation of the gas and liquid as the fluid circulates through the chamber. On the other hand, the separation chamber is not readily lengthened because the drive shaft cannot be allowed to extend unsupported through a lengthened chamber. In the latter situation, vibrations develop in the shaft that can damage the gas separator or reduce its effective life.

It would be advantageous to have multiple, consecutive separation chambers to facilitate a greater separation of the gas and liquid components, while supporting the drive shaft to reduce or eliminate detrimental vibration.

SUMMARY OF THE INVENTION

The present invention features a downhole, gas separator for use in a submergible pumping system. The gas separator comprises an outer housing including a generally hollow interior divided into a plurality of separation chambers. A rotatable shaft extends through the generally hollow interior, and an inducer is mounted within the hollow interior. A plurality of flow-through bearings are distributed along the hollow interior to support the rotatable shaft. Additionally, a plurality of vortex generators are disposed in the hollow interior. At least one flow-through bearing and at least one vortex generator is disposed in each separation chamber.

According to another aspect of the present invention, a submergible pumping system includes a submergible pump and a submergible motor. A drive shaft is connected between the submergible pump and the submergible motor to distribute power from the motor to the pump. Additionally, a gas separator is mounted intermediate the submergible pump and the submergible motor. The gas separator comprises a plurality of gas separation regions.

According to another aspect of the present invention, a method is provided for separating gas and liquid components within a produced fluid stream. The fluid stream is pumped by a submergible pumping system having a submergible motor coupled to a submergible pump by a rotatable drive shaft for use in a downhole, wellbore environment. The method comprises directing a flow of fluid through a hollow interior of a gas separator. Additionally, the method includes inducing a generally circular motion to the flow of fluid as it passes through the hollow interior. Further, the method includes supporting the rotatable drive shaft with a plurality of flow-through bearings at a plurality of regions along the hollow interior of the gas separator.

BRIEF DESCRIPTION OF THE DRAWINGS

The invention will hereafter be described with reference to the accompanying drawings, wherein like reference numerals denote like elements, and:

FIG. 1 is a front elevational view of a submergible pumping system positioned in a wellbore, according to a preferred embodiment of the present invention;

FIG. 2 is an alternate embodiment of the submergible pumping system illustrated in FIG. 1;

FIG. 3 is a partial cross-sectional view taken generally along the axis of the gas separator illustrated in FIG. 1;

FIG. 5 is a partial cross-sectional view taken generally along the axis of an alternate embodiment of the gas separator illustrated in FIG. 3;

FIG. 6 is a partial cross-sectional view taken generally along the axis of another alternate embodiment of the gas separator illustrated in FIG. 3; and FIG. 7 is a partial cross-sectional view taken generally along the axis of another alternate embodiment of the gas separator illustrated in FIG. 3.

DETAILED DESCRIPTION OF THE PREFERRED EMBODIMENTS

Figure 4:
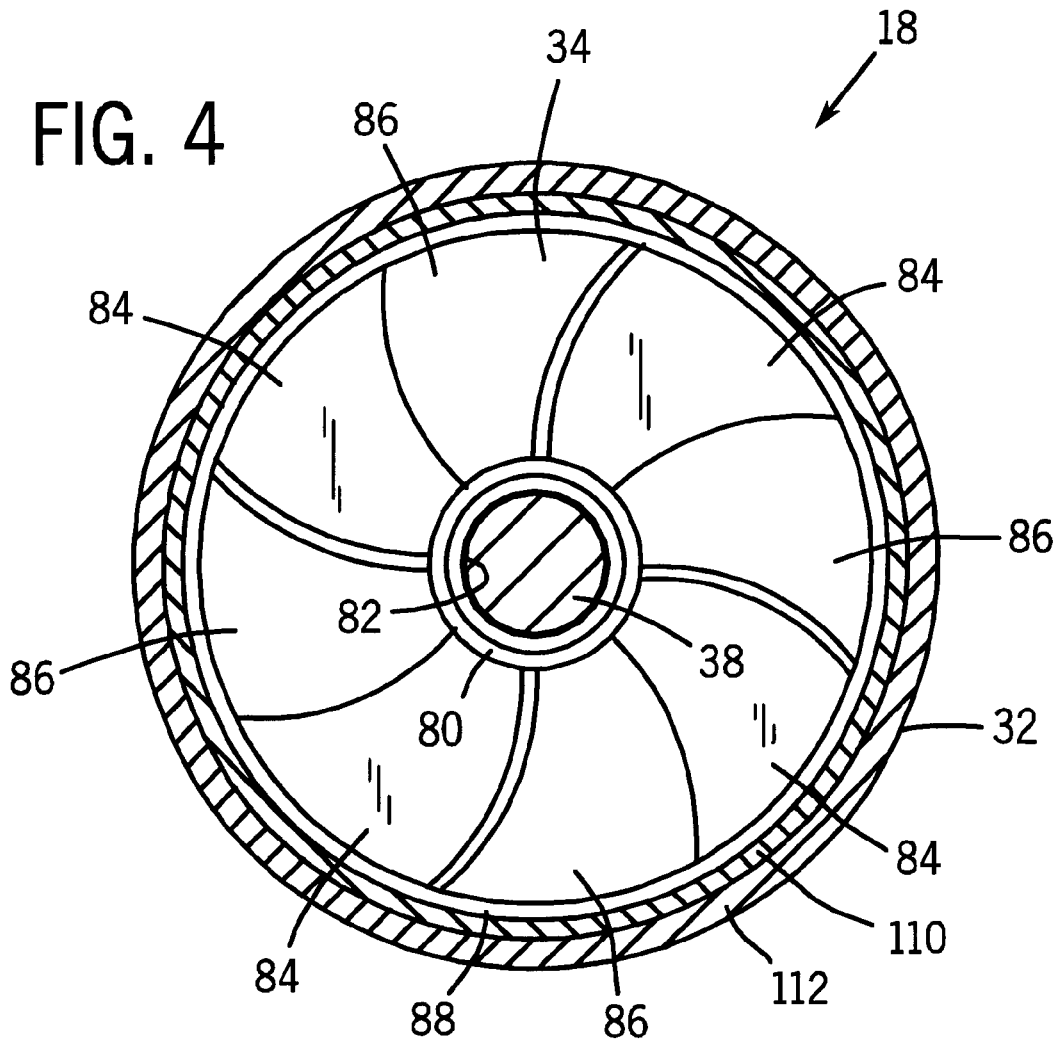
FIG. 4 is a cross-sectional view taken generally along line 4—4 of FIG. 3.

Referring generally to FIG. 1, a submergible pumping system 10 is illustrated according to a preferred embodiment of the present invention. The overall submergible pumping system 10 may comprise a variety of components, depending on the particular application or environment in which the system is used. System 10 typically includes, however, at least a submergible pump 12, a submergible motor 14, a motor protector 16 and a gas separator 18.

System 10 is designed for deployment in a well 20 drilled in a geological formation 22, containing desirable production fluids, such as petroleum. In a typical application, a wellbore 24 is drilled into geological formation 22 and lined with a wellbore casing 26. Submergible pumping system 10 is deployed within wellbore 24 to a desired location for pumping of the wellbore fluids.

An appropriate deployment system 28 is utilized to suspend system 10 in wellbore 24. Deployment system 28 may include, by way of example, deployment cable or a tubing system 30, such as coil tubing or production tubing, through which the produced fluid is pumped by submergible pump 12.

As schematically illustrated in FIG. 1, gas separator 18 includes an outer housing 32 having a hollow interior 34. Hollow interior 34 is divided into a plurality of separation chambers 36. The use of multiple separation chambers 36 lengthens the area over which separation of gas and liquid occurs to facilitate a greater degree of separation.

A drive shaft 38 extends through hollow interior 34 and transfers power from submergible motor 14 to submergible pump 12. In an exemplary embodiment, submergible pump 12 comprises a centrifugal pump having a plurality of impellers (not shown) that are rotated by drive shaft 38. Often, drive shaft 38 is formed from individual sections that remain with a specific component, such as gas separator 18 or motor protector 16. For example, gas separator 18 utilizes a drive shaft section 40 that may be coupled to corresponding drive shaft sections in submergible pump 12 and motor protector 16, as with conventional submergible pumping systems.

Gas separator 18 includes an inducer 42, a plurality of flow-through bearings, such as first flow-through bearing 44 and second flow-through bearing 46, and a plurality of vortex generators, such as first vortex generator 48 and second vortex generator 50. Preferably, at least one flow-through bearing 44, 46 and at least one vortex generator 48, 50 are disposed in each separation region or chamber 36.

In operation, fluid is drawn through a fluid intake 52 by submergible pump 12. This fluid is induced into a generally circular pattern of motion, by inducer 42, along an interior wall 54 that defines hollow interior 34. The fluid circulates in a coiled or helical pattern upwardly through gas separator 18. First and second flow-through bearings 44 and 46 permit the circulating fluid to continue moving upwardly without substantially interfering with the fluid flow. However, each bearing 44 and 46 fully supports drive shaft section 40 within hollow interior 34 to nullify any detrimental vibration during operation. Furthermore, interior wall 54 preferably is substantially straight in the axial direction to facilitate smooth uninterrupted flow from one separation chamber 36 to the next. In other words, wall 54 is substantially parallel, i.e. concentric, with a central axis 55 extending through gas separator 18. The design of interior wall 54 further permits continued maintenance of the vortex as the fluid flows through consecutive separation chambers.

As the fluid moves through first flow-through bearing 44, first vortex generator 48 helps generate and maintain a vortex that facilitates separation of gas and liquid components. This separation process continues as the fluid flow continues to move upwardly from one separation chamber 36 to the next. The fluid moves through second flow-through bearing 46 and past second vortex generator 50, which also aids in generating and maintaining the vortex for enhanced separation of gas and liquid components.

The centrifugal force acting on the circulating fluid moves the heavier liquid to the radially outer area of hollow interior 34, while the lighter gas components remain in the radial center. By the time the fluid mixture has moved through the plurality of separation chambers 36, a substantial percentage of gas has been separated and can be vented to an annulus 56 disposed between submergible pumping system 10 and wellbore casing 26. The liquid is directed into pump 12 for pumping through tubing system 30.

The embodiment illustrated in FIG. 1 shows a pair of separation chambers 36. However, additional separation chambers 36, such as a third and fourth separation chamber, can be added if required or desired for a specific application. For example, in FIG. 2, an embodiment is illustrated in which an additional separation chamber 36 has been added. In other respects, the embodiment of FIG. 2 is the same as that illustrated in FIG. 1.

In the additional separation chamber 36, however, another flow-through bearing 58 and an additional vortex generator 60 have been added. Flow-through bearing 58 and vortex generator 60 represent the components that are typically added when additional separation chambers, such as a third or fourth separation chamber 36, are added.

Referring generally to FIG. 3, a more detailed illustration of the exemplary gas separator 18 of FIG. 1 is shown. In this embodiment, separator 18 includes a lower mounting end 61 that may be connected to, for instance, motor protector 16. Lower mounting end 61 includes a flange 62 having a plurality of openings 64 therethrough for receiving corresponding fasteners 66, such as the illustrated bolts and nuts. Separator 18 also includes an upper mounting end 68 that may be connected to, for instance, submergible pump 12. Upper mounting end 68 includes a plurality of threaded bores 70 for receiving corresponding fasteners 72, such as bolts, by which separator 18 is connected to pump 12.

The illustrated fluid intake 52 includes a plurality of intake openings 74. Fluid is drawn through intake openings 74 and into hollow interior 34 for separation of gaseous and liquid components.

An exemplary inducer 42 includes a fin 76 coiled about a hub 78. Fin 76 preferably is coiled in a generally helical pattern. In this embodiment, hub 78 is affixed to drive shaft 38 in the rotational direction by, for instance, a key and keyway (not shown) as is understood by those of ordinary skill in the art.

First flow-through bearing 44 and second flow-through bearing 46 each include an inner hub 80 having an interior bearing surface 82 by which drive shaft 38 is rotatably supported. A plurality of fins 84 extend radially outward from inner hub 80, as best illustrated in FIG. 4. As further shown in FIG. 4, fins 84 are disposed at an angle such that the fins 84 are generally aligned or parallel with the direction in which the circulating fluid is flowing along interior wall 54 of outer housing 32. Furthermore, the fins 84 are spaced to create a plurality of unobstructed openings or passageways 86 between adjacent fins. The passageways 86 effectively form a plurality of flow-through paths that are generally aligned with the direction of fluid flow. Thus, the flowing fluid receives minimal resistance as it passes through each flow-through bearing.

Fins 84 terminate at an outer ring 88 that lies adjacent interior wall 54 of outer housing 32. Outer ring 88 in combination with fins 84 and inner hub 80 ensure that shaft 38 is fully supported at each flow-through bearing region, e.g. at flow-through bearings 44, 46 and/or 58. The design of the flow-through bearings permits fluid to rapidly progress in a circular pattern through each separation chamber 36 along the entire length of hollow interior 34. However, even though there are multiple separation chambers, the drive shaft 38 is fully supported against vibration throughout hollow interior 34. This permits the lengthening of gas separator 18 and the addition of separation chambers 36 to facilitate greater separation of gas and liquid.

In the illustrated embodiment, first vortex generator 48 is a helical propeller 90. First vortex generator 48 includes a fin 92 coiled about a hub 94 that is affixed to drive shaft 38. Fin 92 may be wrapped about hub 94 in a generally helical pattern, but it preferably includes an upturned discharge end 96 to help propel any remaining centrally located liquid upwardly through second flow-through bearing 46. Additionally, a gap 98 is disposed between the outer perimeter of fin 92 and the interior wall 54 of outer housing 32. Gap 98 permits the liquids induced into circulation along interior wall 54 by inducer 42 to freely travel past first vortex generator 48. To the extent the fluid is not circulating entirely along interior wall 54, first vortex generator 48 facilitates the creation and maintenance of a fluid vortex.

In the illustrated embodiment, helical propeller 90 is disposed between first flow-through bearing 44 and second flow-through bearing 46 in closer proximity to second flow-through bearing 46. However, the exact positioning of the first vortex generator along drive shaft 38 may change depending on the type of vortex generator utilized as well as the composition of the fluid being separated into gas and liquid components.

An exemplary second vortex generator 50 comprises a propeller 99 having a plurality of blades 100 extending radially outward from a central propeller hub 102. Propeller hub 102 is rotationally affixed to drive shaft 38 for rotation therewith.

As the circulating fluid moves upwardly through hollow interior 34, the lighter gas primarily accumulates in the radial center of hollow interior 34 about drive shaft 38. This gas moves upwardly into a plurality of gas outlets 104. Outlets 104 direct the gaseous component of the fluid outwardly to the exterior of gas separator 18 and vent the gas into annulus 56 through a plurality of outlet vent or ports 106.

Simultaneously, the heavier liquid continues to circulate upwardly along interior wall 54 and into a liquid outlet 108. Liquid outlet 108 directs the liquid upwardly into submergible pump 12. The use of multiple separation chambers 36 aids in the greater separation of gas that can be vented into annulus 56 instead of entering submergible pump 12.

It should be noted that outer housing 32 may be formed from an interior liner 110 and an outer shell 112. Gas separator 18 may utilize a liner 110 made from a hardened steel to reduce abrasion and wear caused by the movement of the wellbore fluids therethrough.

Referring generally to FIGS. 5, 6 and 7, certain potential modifications of exemplary gas separator 18 are illustrated. In these Figures, the components described with respect to FIG. 3 have been provided with the same reference numerals. Newly added components have been given different reference numerals to aid in the description of these embodiments of the present invention.

Referring specifically to FIG. 5, first vortex generator 48 comprises an alternate propeller 120. Propeller 120 includes a hub 122 from which a plurality of blades 124 extend. Hub 122 is affixed to drive shaft 38 such that blades 124 rotate with drive shaft 38. In this embodiment, blades 124 are arcuate and extend generally upwardly along drive shaft 38, as illustrated in FIG. 5. Preferably, alternate propeller 120 is located proximate first flow-through bearing 44.

Referring generally to FIG. 6, an embodiment is illustrated with three consecutive separation chambers 36. As described generally with reference to FIG. 2, this embodiment also includes the additional flow-through bearing 58 and the additional vortex generator 60.

Specifically, first vortex generator 48 includes a fin 126 coiled about a hub 128 that is affixed to drive shaft 38. Fin 126 may be wrapped about hub 128 in a generally coiled or helical pattern. In this embodiment, fin 126 extends to interior wall 54 and permits the first vortex generator 48 to function as a supplemental inducer. Vortex generator 48 is capable of supplementing the action of inducer 42, but on an opposite side of first flow-through bearing 44.

In the embodiment illustrated in FIG. 6, second vortex generator 50 comprises an alternate style propeller 130 similar to propeller 120 illustrated in FIG. 5. Propeller 130 includes a central hub 132 mounted to drive shaft 38. A plurality of upturned fins or blades 134 extend radially outward from hub 132. Preferably, blades 134 do not extend to interior surface 54, thereby leaving a gap 136 disposed between each blade 134 and the interior surface 54. Propeller 130 is mounted proximate to and above second flow-through bearing 46.

The third vortex generator 60 is mounted proximate to and above third flow-through bearing 58. This exemplary vortex generator comprises a propeller 140 having a plurality of blades 142 extending radially outward from a central hub 144. Hub 144 is affixed to drive shaft 38, at least with respect to the rotational direction, for rotation therewith.

Referring generally to FIG. 7, an embodiment similar to that illustrated in FIG. 6 is shown. However, in the latter embodiment, the first vortex generator 48 comprises a propeller 146 having a hub 148 as well as a plurality of radially outwardly extending blades 150. Hub 148 is mounted to shaft 38. The overall design of propeller 146 is substantially similar to that of the second vortex generator 50 illustrated in FIG. 6. Also, propeller 146 is mounted above and proximate to first flow-through bearing 44.

Second vortex generator 50, on the other hand, includes a fin 152 coiled about a central hub 154 that is mounted to drive shaft 38 directly above second flow-through bearing 46. Fin 152 and hub 154 can serve as a supplemental inducer to inducer 42. In other words, the particular style of the first and second vortex generators 48 and 50 of FIG. 7 has been reversed compared to that of FIG. 6. The third vortex generator 60, however, is substantially the same in both the embodiment illustrated in FIG. 7 and that illustrated in FIG. 6. The embodiments illustrated in FIGS. 5–7 are exemplary alternate arrangements that can facilitate the separation of gas and liquid in a downhole, wellbore environment.

It will be understood that the foregoing description is of preferred embodiments of this invention, and that the invention is limited to the specific forms shown. For example, a variety of inducers may be utilized; a variety of vortex generators, including propellers and cylinders, can be utilized in the design; the configuration and size of the gas separation housing can be modified according to the particular environment or application; and the specific location and arrangement of interior components can be adjusted as required by varying design parameters and applications. These and other modifications may be made in the design and arrangement of the elements without departing from the scope of the invention as expressed in the appended claims.

What is claimed is:

1. A downhole, gas separator for use in a submergible pumping system, comprising:
   an outer housing including a generally hollow interior divided into a plurality of separation chambers, the generally hollow interior being defined by an interior wall that extends generally parallel to a central axis of the outer housing;
   a rotatable shaft extending through the generally hollow interior;
   a plurality of flow-through bearings, wherein each flow-through bearing includes a plurality of fins oriented so as to be generally parallel with flow of produced fluid; and
   a plurality of vortex generators, wherein at least one flow-through bearing and at least one vortex generator is disposed in each separation chamber.

2. The downhole, gas separator as recited in claim 1, wherein the vortex generator comprises a propeller.

3. The downhole, gas separator as recited in claim 1, wherein the vortex generator comprises a rotating cylinder.

4. The downhole, gas separator as recited in claim 1, further comprising an inducer, wherein the inducer is affixed to the rotatable shaft for rotation therewith.

5. The downhole, gas separator as recited in claim 4, wherein the inducer comprises a coiled fin that induces a produced fluid along a circulating flow path.

6. The downhole, gas separator as recited in claim 1, wherein the plurality of separation chambers includes two separation chambers.

7. The downhole, gas separator as recited in claim 1, wherein the plurality of separation chambers includes three separation chambers.

8. The downhole, gas separator as recited in claim 1, wherein the plurality of separation chambers includes four separation chambers.

9. A submergible pumping system, comprising:
   a submergible pump;
   a submergible motor;
   a drive shaft for delivering power from the submergible motor to the submergible pump; and
   a gas separator mounted intermediate the submergible pump and the submergible motor, wherein the gas separator comprises a plurality of gas separation regions and a plurality of flow-through bearings, each flow-through bearing being configured so that fluid flowing through each flow-through bearing is generally parallel with a flow of circulating fluid entering each flow-through bearing.

10. The submergible pumping system as recited in claim 9, wherein each gas separation region includes a flow-through bearing disposed to support the drive shaft.

11. The submergible pumping system as recited in claim 10, wherein the gas separator comprises an outer housing having a hollow interior therein through which a produced fluid flows to the submergible pump.

12. The submergible pumping system as recited in claim 11, wherein the gas separator includes an inducer mounted to the drive shaft to induce generally circular motion of the produced fluid through the plurality of gas separation regions.

13. The submergible pumping system as recited in claim 12, further comprising a vortex generator disposed in a first gas separation region of the plurality of gas separation regions.

14. The submergible pumping system as recited in claim 13, further comprising a second vortex generator disposed in a second gas separation region of the plurality of gas separation regions.

15. A method for separating gas and liquid in a produced fluid stream pumped through a submergible pumping system having a submergible motor coupled to a submergible pump by a rotatable drive shaft for use in a downhole, wellbore environment, comprising:
   directing a flow of fluid through a hollow interior of a gas separator;
   inducing a generally circular motion to the flow of fluid as it passes through the hollow interior; and
   supporting the rotatable drive shaft with a plurality of flow-through bearings at a plurality of regions along the hollow interior of the gas separator, each flow-through bearing maintaining the generally circular motion of the flow of fluid.

16. The method as recited in claim 15, further comprising generating a vortex within the hollow interior by utilizing a vortex generator mounted to the rotatable drive shaft for rotation therewith.

17. The method as recited in claim 16, wherein generating includes utilizing a plurality of vortex generators disposed in a plurality of regions.

18. The method as recited in claim 16, wherein the step of supporting includes orienting a plurality of flow-through paths at each flow-through bearing in general alignment with the flow of fluid.

19. The method as recited in claim 18, wherein inducing includes rotating a generally helically shaped inducer connected to the rotatable drive shaft.

* * * * *